United States Patent [19]

Tomasik

[11] Patent Number: 5,800,087
[45] Date of Patent: Sep. 1, 1998

[54] PORTABLE CAR WASHING SYSTEM

[76] Inventor: Krzysztof Tomasik, 1204 Kennedy Blvd. #35A, Bayonne, N.J. 07002

[21] Appl. No.: 769,759

[22] Filed: Dec. 20, 1996

[51] Int. Cl.⁶ .......................... A46B 11/02; A46B 11/06
[52] U.S. Cl. ........................... 401/188 R; 401/187
[58] Field of Search ..................... 401/188 R, 187

[56] References Cited

U.S. PATENT DOCUMENTS

| | | | |
|---|---|---|---|
| 278,086 | 5/1883 | Bradford | 401/188 |
| 3,143,756 | 8/1964 | Sisko | 401/188 R |
| 4,546,903 | 10/1985 | Burch | 222/130 |

FOREIGN PATENT DOCUMENTS

| | | | |
|---|---|---|---|
| 88306 | 9/1983 | European Pat. Off. | 401/188 R |
| 41594 | 2/1933 | France | 401/188 |
| 1052041 | 9/1953 | France | 401/188 |
| 405998 | 7/1966 | Switzerland | 401/188 |
| 2068720 | 8/1981 | United Kingdom | 401/188 R |

*Primary Examiner*—Steven A. Bratlie

[57] ABSTRACT

A portable car washing system including a main container having an inverted hollow U-shaped handle formed integrally therewith. The handle has open ends exposed to a hollow interior of the container. The handle has an air inlet port and an air outlet port disposed on opposite ends thereof. The air inlet port is couplable to an air compressor. A water conduit having a rigid lower portion, a flexible upper portion and a coupler therebetween is included. The rigid lower portion extends into the main container. The flexible upper portion has a valve disposed thereon. The valve is removably coupled to a spray attachment. The water conduit sprays pressurized water from within the main container.

1 Claim, 4 Drawing Sheets

PORTABLE CAR WASHING SYSTEM

BACKGROUND OF THE INVENTION

1. Field of the Invention

The present invention relates to a portable car washing system and more particularly pertains to providing a portable source of pressurized water for washing a vehicle with a portable car washing system.

2. Description of the Prior Art

The use of car washing systems is known in the prior art. More specifically, car washing systems heretofore devised and utilized for the purpose of washing cars are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,029,758 to Chayer discloses a high-efficiency, portable car washing system.

U.S. Pat. No. 4,546,903 to Burch discloses a portable car wash unit.

U.S. Pat. No. 4,089,446 to Logan, II et al. discloses a portable water supply and disbursing unit.

U.S. Pat. No. 4,967,960 to Futrell discloses a vehicle wash system.

U.S. Pat. No. 5,405,086 to Kranzle discloses a high-pressure cleaner.

U.S. Pat. No. 5,328,096 to Stenge et al. discloses a spray apparatus and method of operation for spraying heavy viscous material.

While these devices fulfill their respective, particular objective and requirements, the aforementioned patents do not describe a portable car washing system for providing a portable source of pressurized water for washing a vehicle.

In this respect, the portable car washing system according to the present invention substantially departs from the conventional concepts and designs of the prior art, and in doing so provides an apparatus primarily developed for the purpose of providing a portable source of pressurized water for washing a vehicle.

Therefore, it can be appreciated that there exists a continuing need for new and improved portable car washing system which can be used for providing a portable source of pressurized water for washing a vehicle. In this regard, the present invention substantially fulfills this need.

SUMMARY OF THE INVENTION

In the view of the foregoing disadvantages inherent in the known types of car washing systems now present in the prior art, the present invention provides an improved portable car washing system. As such, the general purpose of the present invention, which will be described subsequently in greater detail, is to provide a new and improved portable car washing system and method which has all the advantages of the prior art and none of the disadvantages.

To attain this, the present invention essentially comprises a main container having a generally cylindrical configuration. The main container has a top, a bottom, a front, a rear, opposed sides and a hollow interior. The top has an inverted hollow U-shaped handle formed integrally therewith. The handle has open ends exposed to the hollow interior. The handle has an air inlet port and an air outlet port disposed on opposite ends thereof. The top of the main container has an aperture therethrough. The hollow interior holds a predetermined amount of water therein. An air compressor is secured to one of the opposed sides of the main container. The air compressor has a tube extending outwardly therefrom. The tube has a valve disposed on a free end thereof. The valve is removably coupled with the air inlet port of the handle of the main container. The air compressor has a power cable extending therefrom. A free end of the power cable has an automobile cigarette lighter adapter disposed thereon. The system includes a water conduit having a rigid lower portion, a flexible upper portion and a coupler therebetween. The rigid lower portion extends through the aperture in the top of the main container with the coupler removably secured to the aperture. The flexible upper portion has a valve disposed thereon. The valve is removably coupled to a spray attachment. A brush attachment can be selectively coupled to the valve of the water conduit. A supplemental container is removably coupled to one of the opposed sides of the main container opposite the air compressor. The supplemental container is dimensioned to hold a small quantity of liquid detergent. The system includes a detergent container having a top, a bottom, a front, a rear, opposed sides and a hollow interior. The top has an inverted hollow U-shaped handle formed integrally therewith. The handle has open ends exposed to the hollow interior. The handle has an air inlet port and an air outlet port disposed on opposite ends thereof. The air inlet port is couplable to the valve on the tube of the air compressor. The top of the detergent container has an aperture therethrough for receiving a spray conduit therethrough. The detergent container holds a predetermined amount of detergent within the hollow interior thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable car washing system which has all the advantages of the prior art car washing systems and none of the disadvantages.

It is another object of the present invention to provide a new and improved portable car washing system which may be easily and efficiently manufactured and marketed.

It is a further object of the present invention to provide a new and improved portable car washing system which is of durable and reliable construction.

An even further object of the present invention is to provide a new and improved portable car washing system which is susceptible of a low cost of manufacture with regard to both materials and labor, and which accordingly is then susceptible of low prices of sale to the consuming public, thereby making such a portable car washing system economically available to the buying public.

Even still another object of the present invention is to provide a new and improved portable car washing system for providing a portable source of pressurized water for washing a vehicle.

Lastly, it is an object of the present invention to provide a new and improved portable car washing system including a main container having an inverted hollow U-shaped handle formed integrally therewith. The handle has open ends exposed to a hollow interior of the container. The handle has an air inlet port and an air outlet port disposed on opposite ends thereof. The air inlet port is couplable to an air compressor. A water conduit having a rigid lower portion, a flexible upper portion and a coupler therebetween is included. The rigid lower portion extends into the main container. The flexible upper portion has a valve disposed thereon. The valve is removably coupled to a spray attachment. The water conduit sprays pressurized water from within the main container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
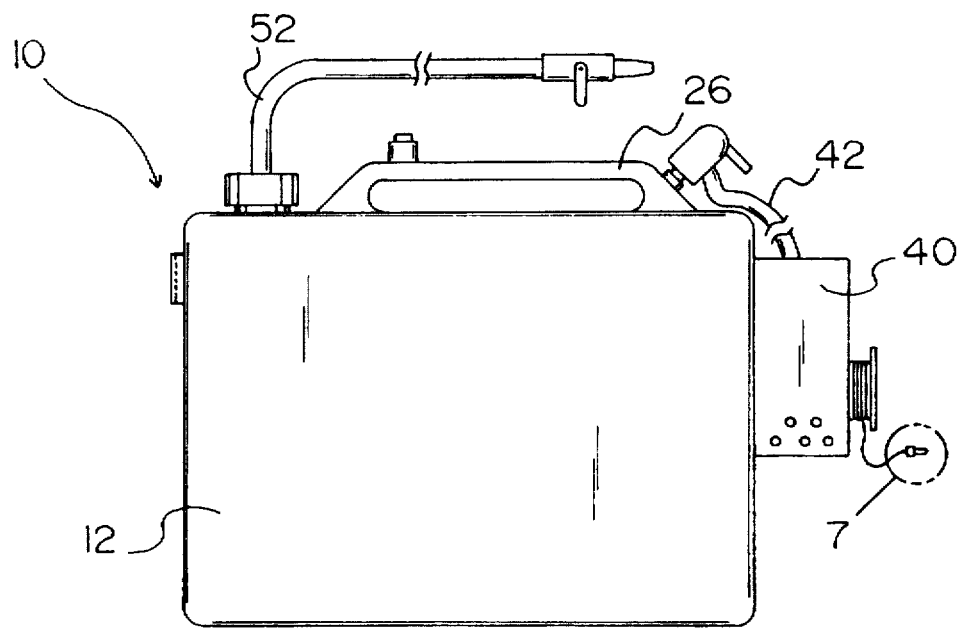
FIG. 1 is a side view of the preferred embodiment of the portable car washing system constructed in accordance with the principles of the present invention.
Figure 2:
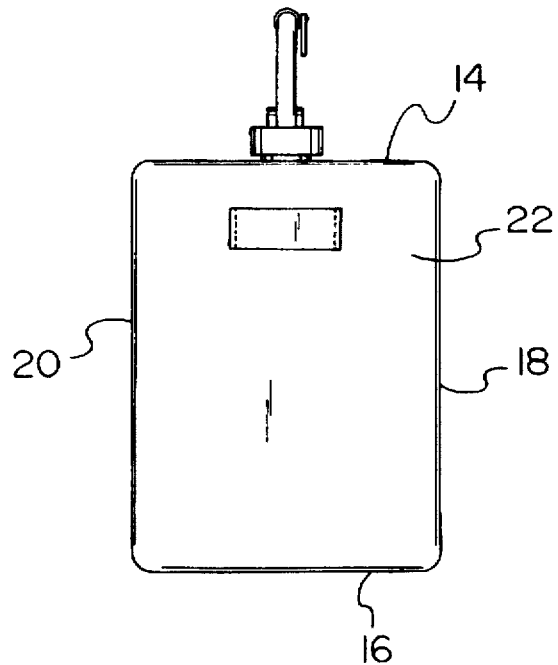
FIG. 2 is a front elevation view of the present invention.
Figure 3:
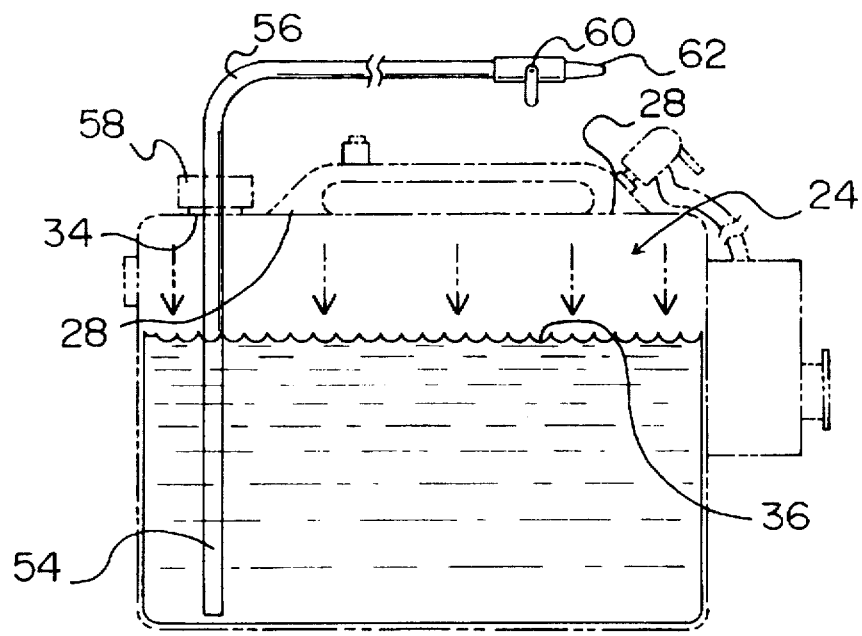
FIG. 3 is a side elevation view of the present invention illustrating the interior of the main container.
Figure 4:
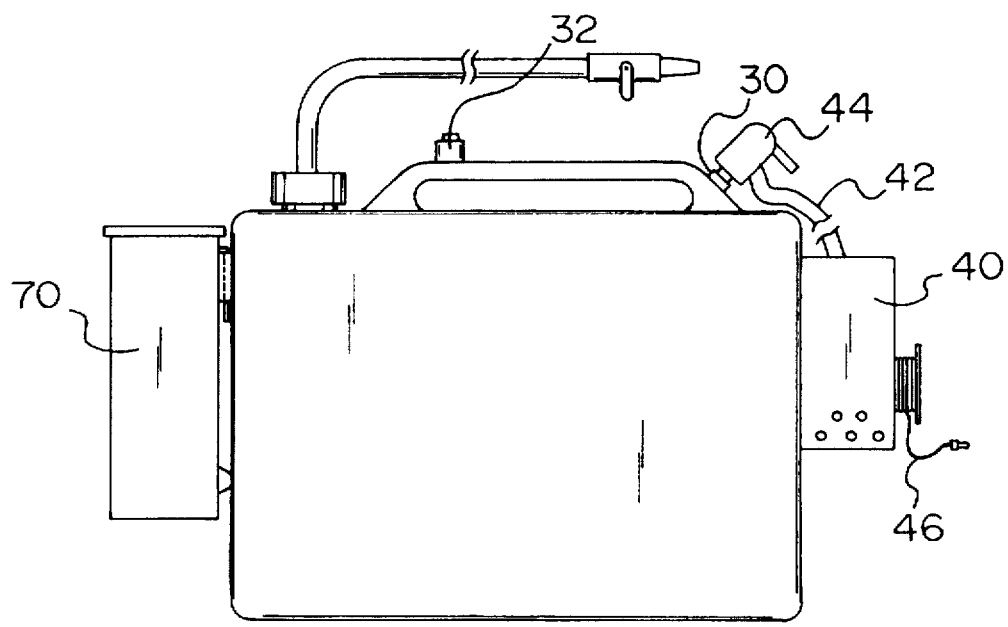
FIG. 4 is a side elevation view of the present invention with the supplemental container attached to the main container.
Figure 5:
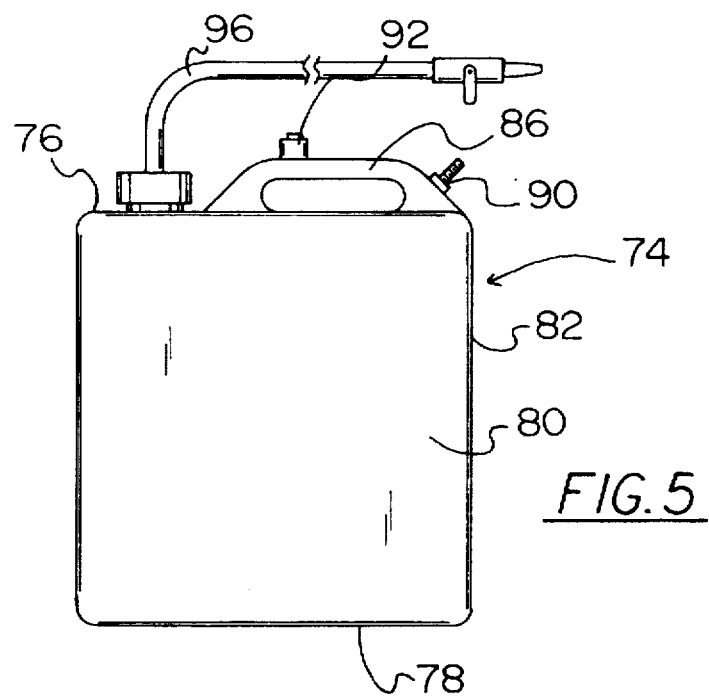
FIG. 5 is a side view of the detergent container of the present invention.
Figure 6:
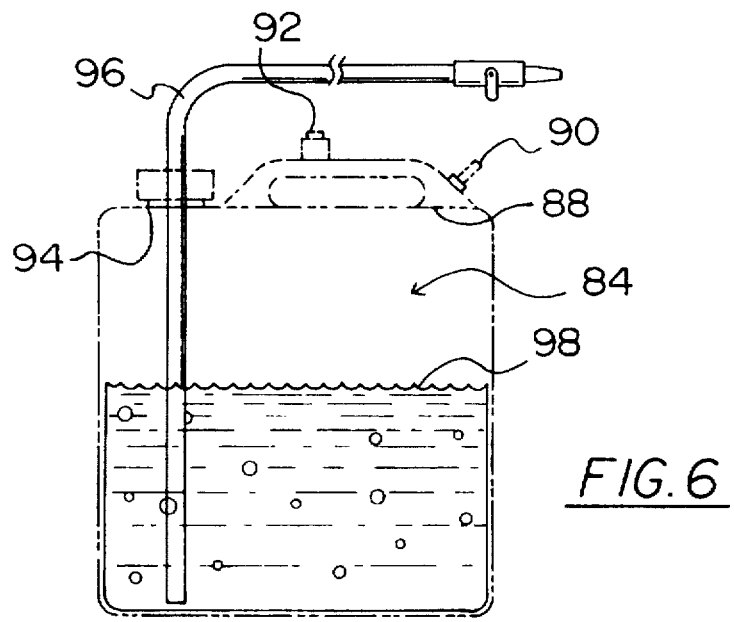
FIG. 6 is a side view of the detergent container shown in cross-section.
Figure 7:
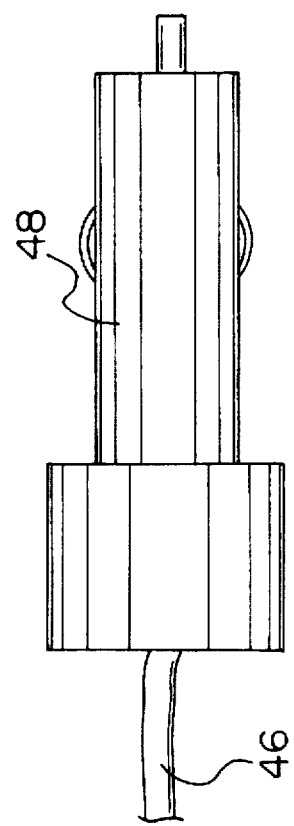
FIG. 7 is a side view of the cigarette lighter attachment taken from circle 7 of FIG. 1.
Figure 8:
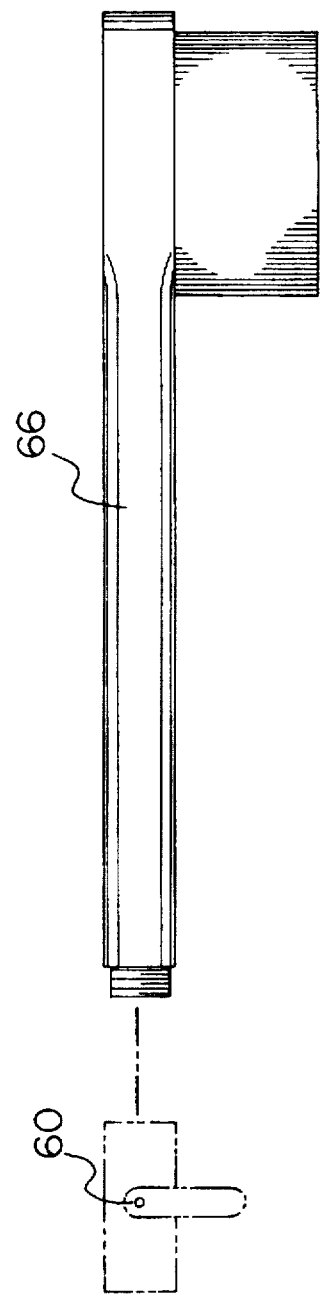
FIG. 8 is a side view of the brush attachment of the present invention.

With reference now to the drawings, and in particular, to FIGS. 1 through 8 thereof, the preferred embodiment of the new and improved portable car washing system embodying the principles and concepts of the present invention and generally designated by the reference number 10 will be described.

Specifically, it will be noted in the various Figures that the device relates to a portable car washing system for providing a portable source of pressurized water for washing a vehicle. In its broadest context, the device consists of a main container, an air compressor, a water conduit, a supplemental container, a brush attachment and a detergent container. Such components are individually configured and correlated with respect to each other so as to attain the desired objective.

The system 10 includes a main container 12 having a generally cylindrical configuration. The main container 12 has a top 14, a bottom 16, a front 18, a rear 20, opposed sides 22 and a hollow interior 24. The top 14 has an inverted hollow U-shaped handle 26 formed integrally therewith. The handle 26 has open ends 28 exposed to the hollow interior 24. The handle 26 has an air inlet port 30 and an air outlet port 32 disposed on opposite ends thereof. The air outlet port 32 serves to release air pressure that has been built up within the main container 12. The top 14 of the main container 12 has an aperture 34 therethrough. The hollow interior 24 holds a predetermined amount of water 36 therein.

Next, an air compressor 40 is secured to one of the opposed sides 22 of the main container 12. The air compressor 40 has a tube 42 extending outwardly therefrom. The tube 42 has a valve 44 disposed on a free end thereof. The valve 44 is removably coupled with the air inlet port 30 of the handle 26 of the main container 12. The air compressor 40 has a power cable 46 extending therefrom. A free end of the power cable 46 has an automobile cigarette lighter adapter 48 disposed thereon. The adapter 48 is simply coupled to a cigarette lighter socket of an automobile to power the air compressor 40. The valve 44 is used to temporarily suspend the air flow from the air compressor 40 to the main container 12. The air compressor 40 serves to pressurize the water 36 within the main container 12.

The system 10 includes a water conduit 52 having a rigid lower portion 54, a flexible upper portion 56 and a coupler 58 therebetween. The rigid lower portion 54 extends through the aperture 34 in the top 14 of the main container 12 with the coupler 58 removably secured to the aperture 38. The flexible upper portion 56 has a valve 60 disposed thereon. The valve 60 is removably coupled to a spray attachment 62. The water conduit 52 serves to transport the pressurized water from within the main container 12 to be dispensed onto the automobile or other item to be sprayed. The valve 60 is used to temporarily suspend the spraying of the pressurized water out through the spray attachment 62.

A brush attachment 66 can be selectively coupled to the valve 60 of the water conduit 52. The removal of the spray attachment 62 will allow for the brush attachment to be properly coupled with the water conduit 52. The brush attachment 66 serves to provide pressurized water coupled with a scrubbing brush for use when washing an automobile.

A supplemental container 70 is removably coupled to one of the opposed sides 22 of the main container 12 opposite the air compressor 40. The supplemental container 70 is dimensioned to hold a small quantity of liquid detergent or the brush attachment 66 or spray attachment 62 when not in use.

Lastly, the system 10 includes a detergent container 74 having a top 76, a bottom 78, a front 80, a rear, opposed sides 82 and a hollow interior 84. The top 76 has an inverted hollow U-shaped handle 86 formed integrally therewith. The handle 86 has open ends 88 exposed to the hollow interior 84. The handle 86 has an air inlet port 90 and an air outlet port 92 disposed on opposite ends thereof. The air inlet port 90 is couplable to the valve 44 on the tube 42 of the air compressor 40. The top 76 of the detergent container 74 has an aperture 94 therethrough for receiving a spray conduit 96 therethrough. The detergent container 74 holds a predetermined amount of detergent 98 within the hollow interior 84 thereof. The detergent container 74 serves to spray pressurized liquid detergent onto an automobile to be washed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents -may be resorted to, falling within the scope of the invention.

What is claimed as being new and desired to be protected by Letters Patent of the United States is as follows:

1. A portable car washing system for providing a portable source of pressurized water for washing a vehicle comprising, in combination:

a main container having a top, a bottom, a front, a rear, opposed sides and a hollow interior, the top having an inverted hollow U-shaped handle formed integrally therewith, the handle having open ends exposed to the hollow interior, the handle having an air inlet port and an air outlet port disposed on opposite ends thereof, the air outlet port adapted for releasing air pressure within the main container, the top of the main container having an aperture therethrough, the hollow interior holding a predetermined amount of water therein;

an air compressor secured to one of the opposed sides of the main container, the air compressor having a tube extending outwardly therefrom, the tube having a valve disposed on a free end thereof, the valve removably coupled with the air inlet port of the handle of the main container, the air compressor having a power cable extending therefrom, a free end of the power cable having an automobile cigarette lighter adapter disposed thereon;

a water conduit having a rigid lower portion, a flexible upper portion and a coupler therebetween, the rigid lower portion extending through the aperture in the top of the main container with the coupler removably secured to the aperture, the flexible upper portion having a valve disposed thereon, the valve removably coupled to a spray attachment;

a brush attachment selectively coupled to the valve of the water conduit;

a supplemental container removably coupled to one of the opposed sides of the main container opposite the air compressor, the supplemental container dimensioned to hold a small quantity of liquid detergent and the brush attachment; and a detergent container having a top, a bottom, a front, a rear, opposed sides and a hollow interior, the top having an inverted hollow U-shaped handle formed integrally therewith, the handle having open ends exposed to the hollow interior, the handle having an air inlet port and an air outlet port disposed on opposite ends thereof, the air inlet port couplable to the valve on the tube of the air compressor, the top of the detergent container having an aperture therethrough for receiving a spray conduit therethrough, the detergent container holding a predetermined amount of detergent within the hollow interior thereof.

* * * * *